(12) United States Patent
Lee et al.

(10) Patent No.: US 12,538,360 B2
(45) Date of Patent: Jan. 27, 2026

(54) COORDINATED-SPATIAL REUSE (CO-SR) TRANSMISSION METHOD AND APPARATUS THEREOF

(71) Applicant: MEDIATEK INC., Hsinchu (TW)

(72) Inventors: Tsungjung Lee, Hsinchu (TW); Pochun Fang, Hsinchu (TW); Ray-Kuo Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 356 days.

(21) Appl. No.: 18/455,010

(22) Filed: Aug. 24, 2023

(65) Prior Publication Data

US 2024/0073953 A1 Feb. 29, 2024

Related U.S. Application Data

(60) Provisional application No. 63/373,560, filed on Aug. 26, 2022.

(51) Int. Cl.
*H04W 74/0816* (2024.01)
*H04W 84/12* (2009.01)

(52) U.S. Cl.
CPC ........ *H04W 74/0816* (2013.01); *H04W 84/12* (2013.01)

(58) Field of Classification Search
None
See application file for complete search history.

(56) References Cited

U.S. PATENT DOCUMENTS

| 2021/0282186 A1 | 9/2021 | Cherian |
| 2022/0123881 A1* | 4/2022 | Li .......... H04L 5/0035 |
| 2023/0224944 A1 | 7/2023 | Shen |

FOREIGN PATENT DOCUMENTS

| EP | 4539586 A1 * | 4/2025 | ............ H04W 24/08 |
| WO | 2022/057655 A1 | 3/2022 | |

OTHER PUBLICATIONS

Extended European Search Report dated Jan. 8, 2024, issued in application No. EP 23193437.3.
Han, J. et al.; "Shared TXOP Spatial Reuse Considerations;" IEEE 801.11-20/0590r5; May 2020; pp. 1-24.
Seok, Y. et al.; "Coordinated Spatial Reuse Protocol;" IEEE 801.11-20/0576r1; Apr. 2020; pp. 1-21.
Chinese language Notice of Allowance dated Jan. 16, 2024, issued in application No. TW 112132123.

* cited by examiner

*Primary Examiner* — Walter J Divito
(74) *Attorney, Agent, or Firm* — McClure, Qualey & Rodack, LLP

(57) ABSTRACT

Coordinated-spatial reuse (CO-SR) transmission methods are provided. In a CO-SR transmission method, a transceiver of a sharing access point (AP) may transmit an announcement frame to a shared AP, the transceiver may receive a first block acknowledgement (BA) frame from a first station (STA) associated with the sharing AP, and the transceiver may transmit a dummy clear-to-send (CTS) frame before transmitting the next announcement frame in response to the first STA being a first legacy STA.

20 Claims, 9 Drawing Sheets

COORDINATED-SPATIAL REUSE (CO-SR) TRANSMISSION METHOD AND APPARATUS THEREOF

CROSS REFERENCE TO RELATED APPLICATIONS

This application claims the benefits of U.S. Provisional Application No. 63/373,560 filed on Aug. 26, 2022, the entirety of which is incorporated by reference herein.

BACKGROUND OF THE INVENTION

Field of the Invention

The invention generally relates to coordinated-spatial reuse (CO-SR) technology, and more particularly, to a CO-SR transmission method and apparatus.

Description of the Related Art

IEEE 802.11 is a set of media access control (MAC) and physical layer (PHY) specifications for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significantly wider channel bandwidths (20 MHz, 40 MHz, 80 MHz, and 160 MHz) were proposed in the IEEE 802.11ac standard. The High Efficiency WLAN study group (HEW SG) is a study group within the IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

Coordinated-spatial reuse (CO-SR) is an application of the potential Wi-Fi8 spatial reuse (SR) scheme under the multi-AP operation framework. The CO-SR transmission may joint power control and link adaptation among multiple APs to minimize spatial reuse caused negative impact and maximize total throughput among multi-APs.

In conventional CO-SR transmission, when the stations (STAs) in CO-SR RS transmission are legacy STAs, the BA frame from the STA associated with the shared AP may overlap with the next announcement frame from the sharing AP. As a result, the shared AP may not receive the next announcement frame from the sharing AP successfully to maintain the CO-SR transmission.

Therefore, how to avoid interference between the announcement frame from the sharing AP and the BA frame from the STA associated with the shared AP is a topic that is worthy of discussion.

BRIEF SUMMARY OF THE INVENTION

Coordinated-spatial reuse (CO-SR) transmission methods and apparatus for CO-SR transmission are provided to overcome the problems mentioned above.

An embodiment of the invention provides a CO-SR transmission method. In the CO-SR transmission method, a transceiver of a sharing access point (AP) may transmit an announcement frame to a shared AP, the transceiver may receive a first block acknowledgement (BA) frame from a first station (STA) associated with the sharing AP, and the transceiver may transmit a dummy clear-to-send (CTS) frame before transmitting the next announcement frame in response to the first STA being a first legacy STA.

An embodiment of the invention provides a CO-SR transmission method. In the CO-SR transmission method, a transceiver of a shared access point (AP) receives an announcement frame from a sharing AP, a processor of the shared AP shrinks the length of a data frame in response to a station (STA) associated with the shared AP being a legacy STA, the transceiver transmits the data frame to the STA, and the transceiver receives a block acknowledgement (BA) frame from the STA.

An embodiment of the invention provides apparatus for CO-SR transmission. The apparatus may include a transceiver and a processor. The transceiver may wirelessly communicate with a sharing access point (AP). The processor may be coupled to the transceiver. The transceiver receives an announcement frame from the sharing AP. The processor shrinks the length of the data frame in response to a station (STA) associated with the shared AP being a legacy STA, the transceiver transmits the data frame to the STA. The transceiver receives a block acknowledgement (BA) frame from the STA Other aspects and features of the invention will become apparent to those with ordinary skill in the art upon review of the following descriptions of specific embodiments of the CO-SR transmission method and apparatus for CO-SR transmission.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
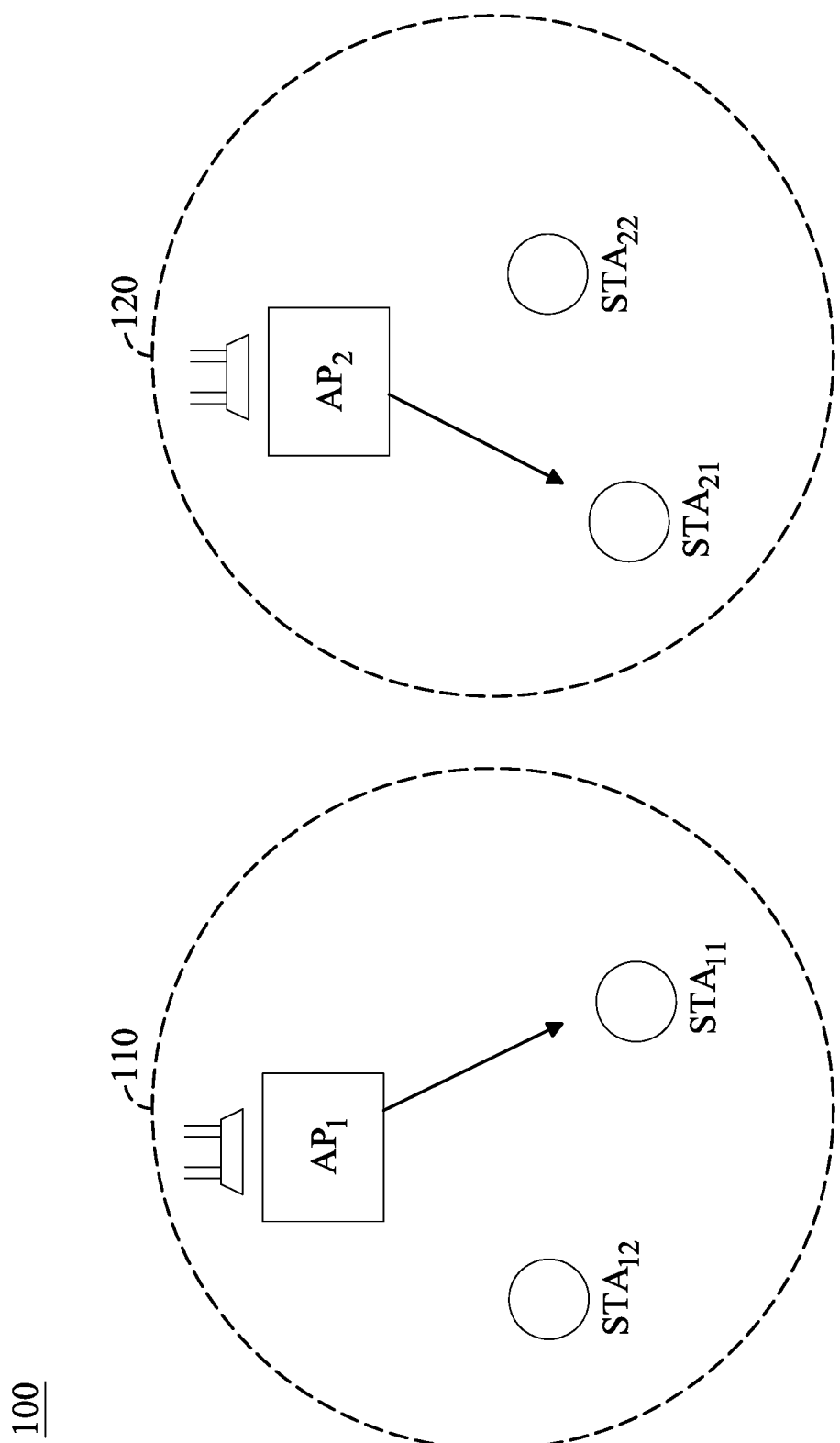
FIG. 1 is a block diagram of a wireless communication network 100 according to an embodiment of the invention.

FIG. 1 is a block diagram of a wireless communication network 100 according to an embodiment of the invention. As shown in FIG. 1, the wireless network 100 may comprise a basic service set (BSS) 110 and a second BBS 120. The first BSS may comprise an access point (AP) $AP_1$, a station (STA) $STA_{11}$ and a station $STA_{12}$. The second BSS may comprise an access point $AP_2$, a station $STA_{21}$ and a station $STA_{22}$. It should be noted that, in order to clarify the concept of the invention, FIG. 1 presents a simplified block diagram in which only the elements relevant to the invention are shown. However, the invention should not be limited to what is shown in FIG. 1.

In an embodiment, the access points $AP_1$ and $AP_2$ may include wireless routers, access points, laptops, desktop computers, smart phones, tablet PCs, etc. In some embodiments, the access point AP1 may be regarded as a controller device which is connected to a WAN (wide area network) port of a modem device (not shown in FIG. 1A) through a backhaul link. In addition, it should be noted that, in order to illustrate the embodiments of the invention, the access point $AP_1$ may be regarded as a sharing AP and the access point $AP_2$ may be regarded as the shared AP in the coordinated-spatial reuse (CO-SR) transmission.

In an embodiment, each of the station $STA_{11}$, station $STA_{12}$, station $STA_{21}$ and station $STA_{22}$ may be a UE such as a portable or mobile apparatus, a wearable apparatus, a wireless communication apparatus or a computing apparatus. For example, STA may be implemented in a smartphone, a smartwatch, a personal digital assistant, a digital camera, or a computing equipment such as a tablet computer, a laptop computer or a notebook computer. In addition, in the embodiments, the station $STA_{11}$, a station $STA_{12}$, station $STA_{21}$ and a station $STA_{22}$ may be legacy STAs. The legacy STA may be high-throughput (HT) STA or very-high-throughput (VHT) STA. In addition, in the embodiments of the invention, the non-legacy STAs may be the STAs in Wi-Fi 6, Wi-Fi 7, or other newer Wi-Fi standards, e.g., the non-legacy STAs may be high-efficiency (HE) STAs or an extremely-high-throughput (EHT) STAs.

Figure 2:
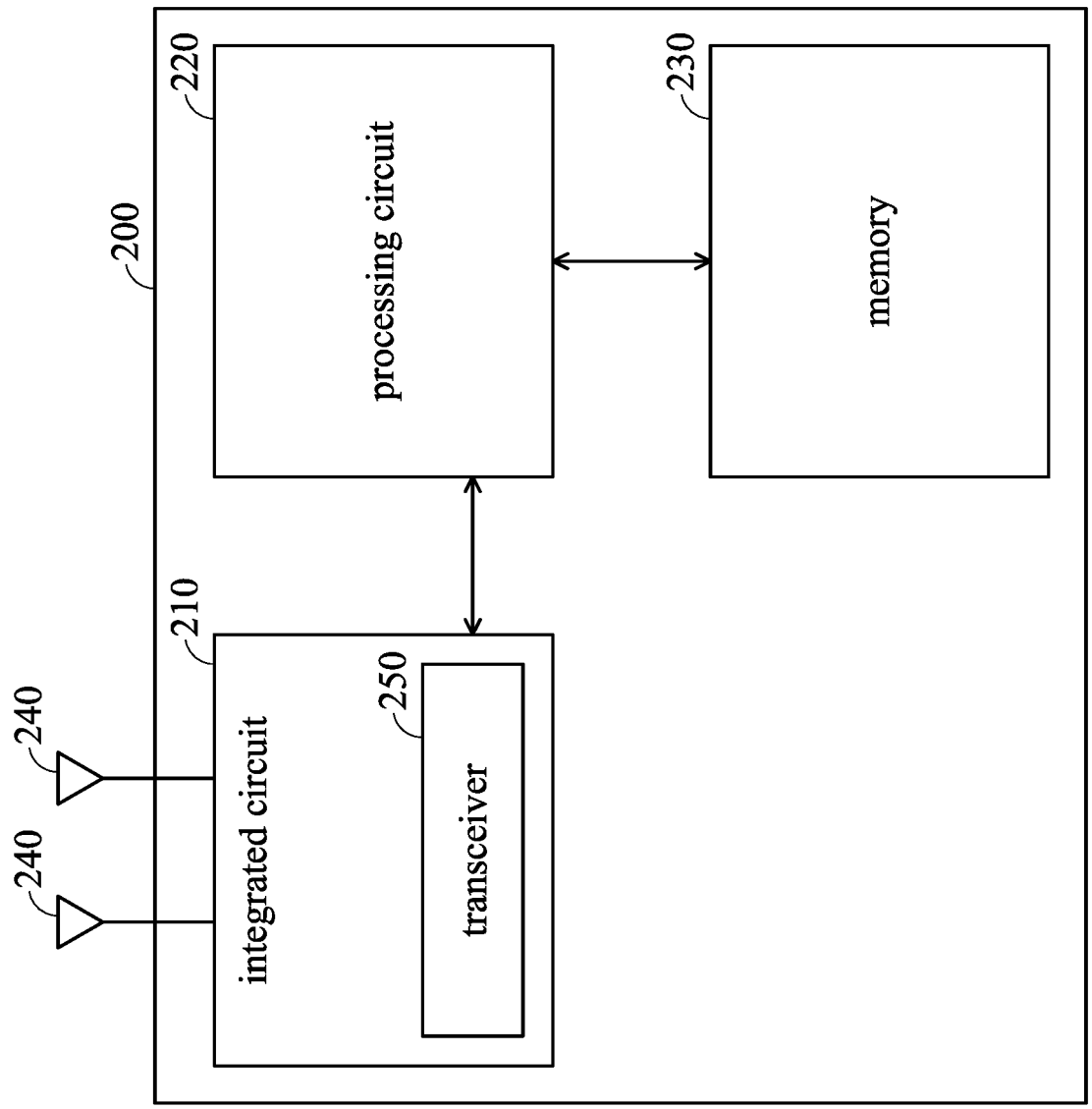
FIG. 2 is a block diagram of an access point 200 according to an embodiment of the invention.

FIG. 2 is a block diagram of an access point 200 according to an embodiment of the invention. The access point 200 may be applied to the access point AP1 and the access point AP2. As shown in FIG. 2, the access point 200 may include an integrated circuit 210, processing circuit 220, a memory 230, and at least one antenna 240. The antennas 240 may transmit and receive radio frequency (RF) signals. It should be noted that, in order to clarify the concept of the invention, FIG. 2 presents a simplified block diagram in which only the elements relevant to the invention are shown. However, the invention should not be limited to what is shown in FIG. 2.

The integrated circuit 210 is coupled to the antennas 240, and the integrated circuit 210 may include one or more transceivers 250 which may receive RF signal from the antennas 240, convert them to baseband signals, and send the baseband signals to the processing circuit 220. The transceivers 250 may also receive the baseband signals from the processing circuit 220, convert them to RF signal, and send out the RF signals to antennas 240. The transceivers 250 may comprise a plurality of hardware elements to perform radio frequency conversion. For example, the transceivers 250 may comprise a power amplifier, a mixer, an analog-to-digital converter (ADC) and a digital-to-analog converter (DAC), but the invention should not be limited thereto.

In some embodiments, the integrated circuit 210 may be a Wi-Fi chip, and the integrated circuit 210 and the processing circuit 220 may be implemented by a system-on-chip (SoC), but the disclosure is not limited thereto.

In some embodiments, the processing circuit 220 may be implemented by a central processing unit (CPU), a general-purpose processor, a digital signal processor (DSP), or a microcontroller, but the disclosure is not limited thereto. In the embodiments of the invention, the processing circuit 220 may control the operations of the integrated circuit 210 and the memory 230. According to an embodiment of the invention, the processing circuit 220 may also be arranged to execute the program codes of the software modules. The program codes accompanied by specific data in a data structure may also be referred to as a processor logic unit or a stack instance when being executed. Therefore, the processing circuit 220 may be regarded as being comprised of a plurality of processor logic units, each for executing one or more specific functions or tasks of the corresponding software modules.

The memory 230 may be a volatile memory or a non-volatile memory. For example, the volatile memory may be a static random access memory (SRAM) or a dynamic random access memory (DRAM), and the non-volatile memory may be a flash memory, a read-only memory (ROM), an erasable programmable read-only memory (EPROM), or an electrically erasable programmable read-only memory (EEPROM), but the disclosure is not limited thereto. In addition, the memory 230 may store instructions or firmware that can be executed by the processing circuit 220 to control operations of the access point 200.

Figure 3:
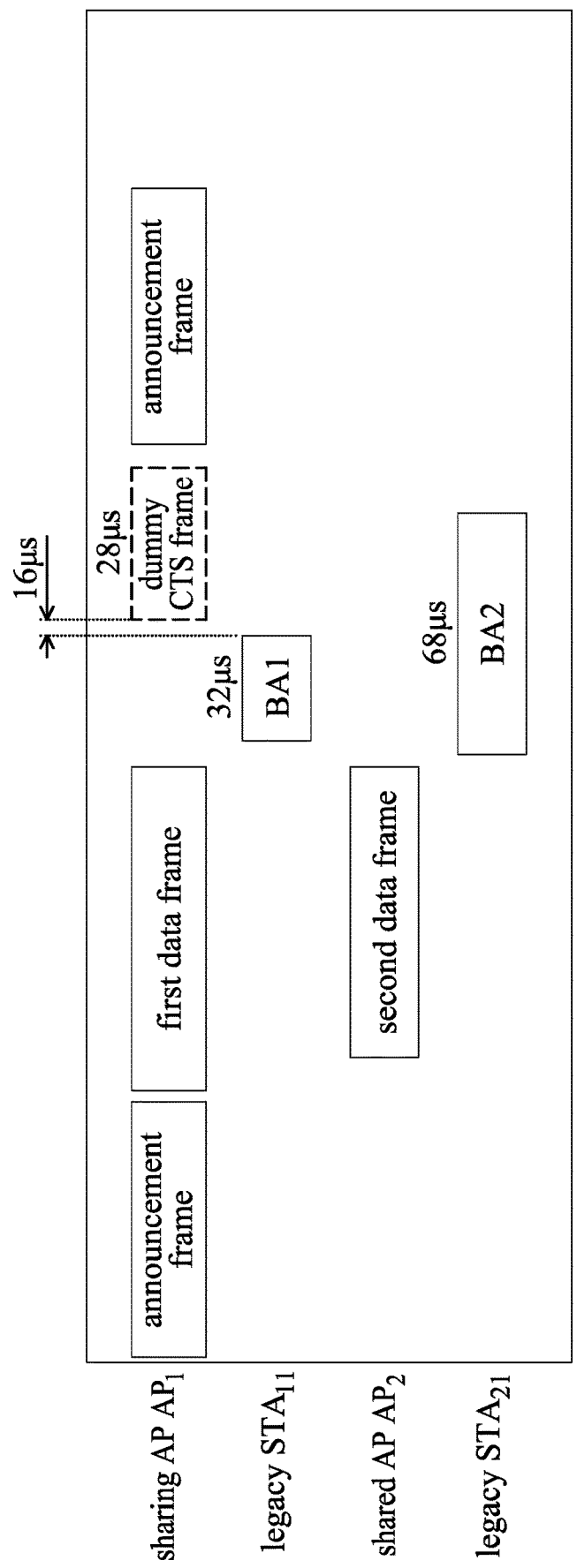
FIG. 3 is schematic diagrams illustrating CO-SR transmission for legacy STA according to an embodiment of the invention.

FIG. 3 is schematic diagrams illustrating CO-SR transmission for legacy STA according to an embodiment of the invention. As shown in FIG. 3, the sharing AP (i.e., access point AP1) may transmit an announcement frame (e.g., Co-SR announcement frame) to the shared AP (i.e., access point $AP_2$).

In the embodiments of the invention, the announcement frame may comprise information the shared AP Tx power control, Co-SR duration, shared AP's medium access control (MAC) address, and so on. In addition, the announcement frame may further comprise a sharing AP block acknowledgement (BA) type field and a sharing AP BA length. The sharing AP BA type may comprise legacy BA, trigger for BA and multi-user BA request (MU-BAR). The sharing AP BA type field may indicate the sharing AP BA type in the CO-SR transmission. For example, in FIGS. 3-5, the sharing AP BA type may be legacy BA, i.e., the STAs in the CO-SR transmission is legacy BAs (e.g., HT STAs or VHT STAs). In another example, in FIG. 6, the sharing AP BA type may be trigger for BA. In another example, in FIG. 7, the sharing AP BA type may be MU-BAR. The sharing AP BA length field may indicate the BA length in the CO-SR transmission.

After the shared AP receives the announcement frame, the shared AP and the sharing AP may each perform downlink data transmission. The sharing AP may transmit a first data frame to a STA associated with the sharing AP (taking the station $STA_{11}$ as an example in FIG. 3), and the shared AP may transmit a second data frame to a STA associated with the shared AP (taking the station $STA_{21}$ as an example in FIG. 3). As shown in FIG. 3, in the embodiment, transmission of the first data frame and transmission of the second data frame may end simultaneously, i.e., the tail of the second data frame is aligned to the tail of the first data frame.

In the embodiment, the first data frame and second data frame may be aggregated MAC protocol data unit (A-MPDU).

After the transmission of the first data frame and the second data frame, the station $STA_{11}$ associated with the sharing AP may transmit a first BA frame BA1 to the sharing AP, and the station $STA_{21}$ associated with the shared AP may transmit a second BA frame BA2 to the shared AP. The transmission rate of the station $STA_{11}$ and station $STA_{21}$ may be different. As a result, when the station $STA_{11}$ and station $STA_{21}$ are legacy stations (e.g., HT STAs or VHT STAs) and the BA duration of the second BA frame BA2 is too long, the second BA frame BA2 from the station $STA_{21}$ may overlap with the next announcement frame from the sharing AP. Therefore, in the embodiment, the sharing AP may transmit dummy clear-to-send (CTS) frame before transmitting the next announcement frame to avoid the interference between the second BA frame BA2 and the next announcement frame. The sharing AP may transmit the dummy CTS frame after a frame space (e.g., a short inter-frame space (SIFS)) between the first BA frame BA1 and the dummy CTS frame. The total length of the length of the first BA frame BA1, the length of the frame space and the length of the dummy CTS frame may be longer than the length of the second BA frame BA2. For example, if the length of the first BA frame BA1 is 321 µs, the length of the second BA frame BA2 is 681 µs, and the length of the frame space is 161 µs, the length of the dummy CTS frame may be set to 281 µs (i.e., 32+16+28>68).

Figure 4:
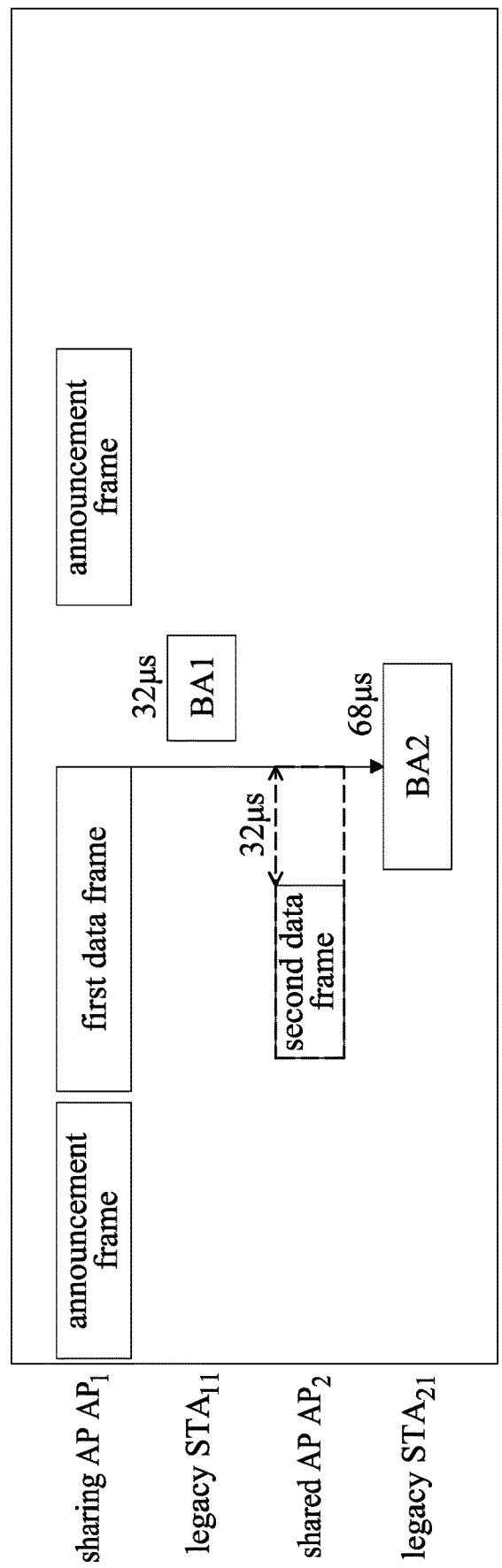
FIG. 4 is schematic diagrams illustrating CO-SR transmission for legacy STA according to another embodiment of the invention.

FIG. 4 is schematic diagrams illustrating CO-SR transmission for legacy STA according to another embodiment of the invention. As shown in FIG. 4, the sharing AP (i.e., access point AP1) may transmit an announcement frame (e.g., Co-SR announcement frame) to the shared AP (i.e., access point AP2).

After the shared AP receives the announcement frame, the shared AP and the sharing AP may each perform downlink data transmission. The sharing AP may transmit a first data frame to a STA associated with the sharing AP (taking the station $STA_{11}$ as an example in FIG. 4), and the shared AP may transmit a second data frame to a STA associated with the shared AP (taking the station $STA_{21}$ as an example in FIG. 4). In the embodiment, the first data frame and second data frame may be A-MPDU. As shown in FIG. 4, in the embodiment, the shared AP may shrink the length (i.e., the transmission duration) of the second data frame by default length. For example, the shared AP may shrink the length of the second data frame by 321 µs (i.e., the default length). Specifically, in conventional CO-SR transmission for legacy STA, the tail of the second data frame is aligned to the tail of the first data frame. However, in the embodiment, as shown in FIG. 4, the shared AP may shrink the length of the second data frame to avoid the second BA frame BA2 from the station $STA_{21}$ associated with the shared AP overlap with the next announcement frame from the sharing AP.

After the transmission of the first data frame and the second data frame, the station $STA_{11}$ associated with the sharing AP may transmit the first BA frame BA1 to the sharing AP, and the station $STA_{21}$ associated with the shared AP may transmit the second BA frame BA2 to the shared AP. In the embodiment, even if the BA duration (e.g., 681 µs) of the second BA frame BA2 is longer than the BA duration (e.g., 321 µs) of the first BA frame BA1, the second BA frame BA2 will not overlap with the next announcement frame from the sharing AP.

Figure 5:
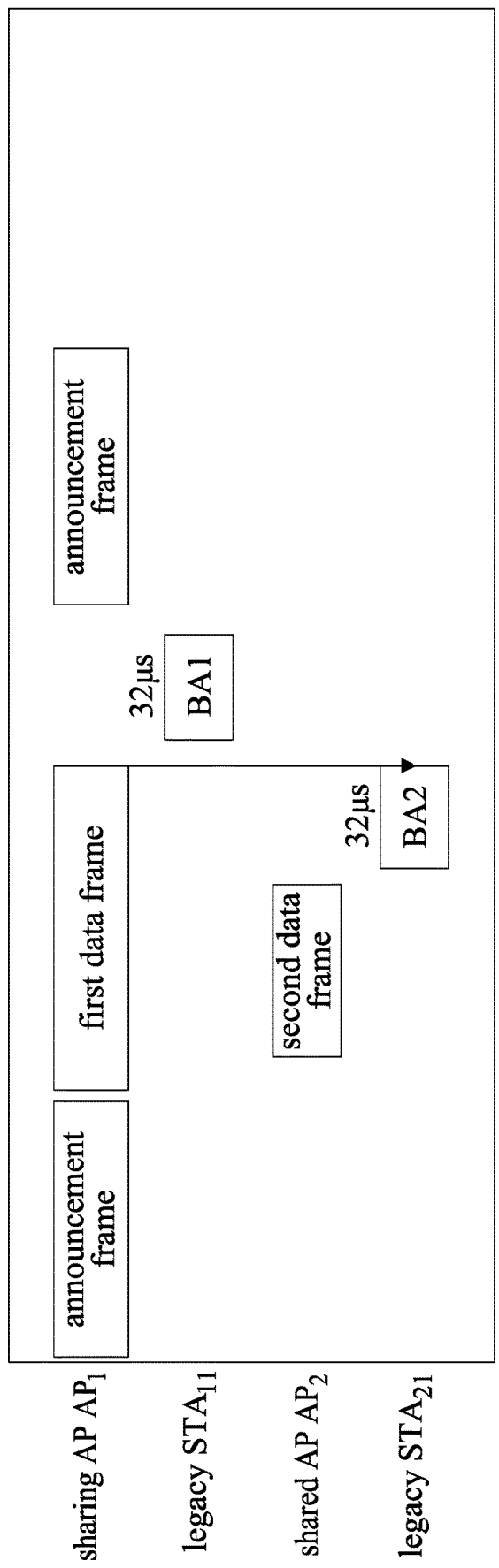
FIG. 5 is schematic diagrams illustrating CO-SR transmission for legacy STA according to another embodiment of the invention.

FIG. 5 is schematic diagrams illustrating CO-SR transmission for legacy STA according to another embodiment of the invention. As shown in FIG. 5, the sharing AP (i.e., access point AP1) may transmit an announcement frame (e.g., Co-SR announcement frame) to the shared AP (i.e., access point AP2).

After the shared AP receives the announcement frame, the shared AP and the sharing AP may each perform downlink data transmission. The sharing AP may transmit a first data frame to a STA associated with the sharing AP (taking the station $STA_{11}$ as an example in FIG. 4), and the shared AP may transmit a second data frame to a STA associated with the shared AP (taking the station $STA_{21}$ as an example in FIG. 4). In the embodiment, the first data frame and second data frame may be A-MPDU. As shown in FIG. 5, in the embodiment, the shared AP may shrink or adjust the length of the second data frame to make the tail of the second BA frame BA2 is aligned with the tail of the first data frame. Specifically, the shared AP may estimate the length of the second BA frame BA2 based on a look-up table. The look-up table may record that the relationship between the transmission rates of the station $STA_{21}$ and the lengths of the second BA frame BA2, e.g., look-up table may record that the transmission rate 24 Mbps is corresponded to length 321 µs, the transmission rate 12 Mbps is corresponded to length 441 µs and the transmission rate 6 Mbps is corresponded to length 681 µs. Because the transmission rate of the STA associated with the shared AP is usually the same as the transmission rate of the shared AP, the shared AP may estimate the length of the second BA frame BA2 based on its transmission rate (i.e., the transmission rate of the shared AP) and the look-up table. After the shared AP has estimated the length of the second BA frame BA2, the may shrink or adjust the length of the second data frame based on the estimated length of the second BA frame BA2 to make the tail of the second BA frame BA2 is aligned with the tail of the first data frame. For example, as shown in FIG. 5, the shared AP may shrink the length of the second data frame based on the estimated length (321 µs) of the second BA frame BA2. It should be noted that in FIG. 5, the estimated length of the second BA frame BA2 is 321 µs, but the invention should not be limited thereto.

After the transmission of the first data frame and the second data frame, the station $STA_{11}$ associated with the sharing AP may transmit the first BA frame BA1 to the sharing AP, and the station $STA_{21}$ associated with the shared AP may transmit the second BA frame BA2 to the shared AP. In the embodiment, because the tail of the second BA frame BA2 is aligned with the tail of the first data frame, the second BA frame BA2 will not overlap with the next announcement frame from the sharing AP.

Figure 6:
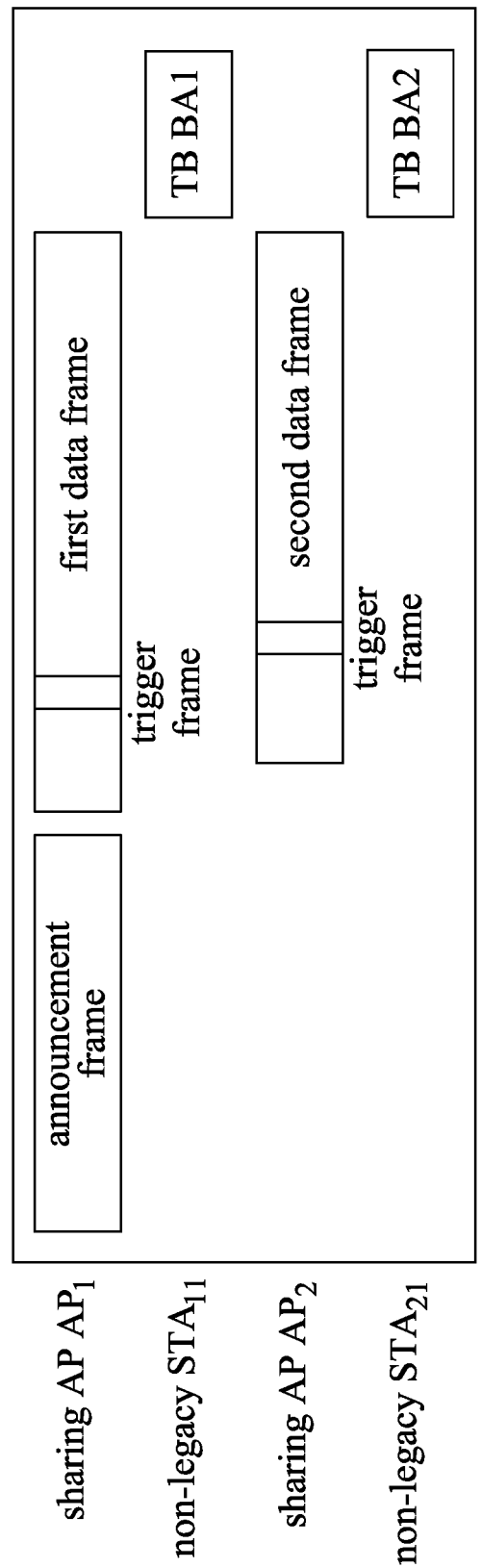
FIG. 6 is schematic diagrams illustrating CO-SR transmission for non-legacy STA according to an embodiment of the invention.

FIG. 6 is schematic diagrams illustrating CO-SR transmission for non-legacy STA (e.g., HE STA or EHT STA) according to an embodiment of the invention. As shown in FIG. 6, the sharing AP (i.e., access point AP1) may transmit an announcement frame (e.g., Co-SR announcement frame) to the shared AP (i.e., access point AP2). The announcement frame may comprise a trigger-based (TB) BA length.

After the shared AP receives the announcement frame, the shared AP and the sharing AP may each perform downlink data transmission. The sharing AP may transmit a first data frame to a STA associated with the sharing AP (taking the station $STA_{11}$ as an example in FIG. 6), and the shared AP may transmit a second data frame to a STA associated with the shared AP (taking the station $STA_{21}$ as an example in FIG. 6). In the embodiment, the first data frame and second data frame may be A-MPDU. As shown in FIG. 6, in the embodiment, the first data frame and the second data frame may comprise a trigger frame. The trigger frame may indicate the transmission rates and lengths of the first BA frame BA1 and the second BA frame BA2. That is, in the embodiment, the sharing AP BA type is trigger for BA, and the first BA frame BA1 and the second BA frame BA2 are trigger-based (TB) BAs triggered by trigger frame.

After the transmission of the first data frame and the second data frame, the station $STA_{11}$ associated with the sharing AP may transmit the first BA frame BA1 to the sharing AP, and the station $STA_{21}$ associated with the shared AP may transmit the second BA frame BA2 to the shared AP.

Figure 7:
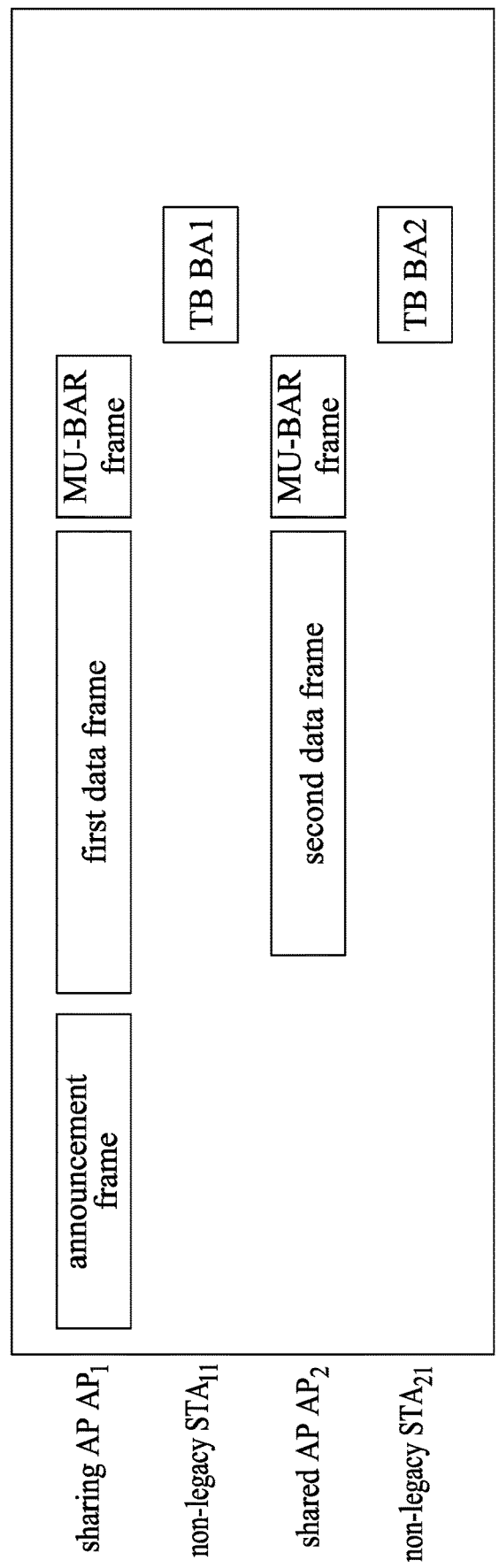
FIG. 7 is schematic diagrams illustrating CO-SR transmission for non-legacy STA according to another embodiment of the invention.

FIG. 7 is schematic diagrams illustrating CO-SR transmission for non-legacy STA (e.g., HE STA or EHT STA) according to another embodiment of the invention. As shown in FIG. 7, the sharing AP (i.e., access point AP1) may transmit an announcement frame (e.g., Co-SR announcement frame) to the shared AP (i.e., access point $AP_2$). The announcement frame may comprise a trigger-based (TB) BA length.

After the shared AP receives the announcement frame, the shared AP and the sharing AP may each perform downlink data transmission. The sharing AP may transmit a first data frame to a STA associated with the sharing AP (taking the station $STA_{11}$ as an example in FIG. 7), and the shared AP may transmit a second data frame to a STA associated with the shared AP (taking the station $STA_{21}$ as an example in FIG. 6). In the embodiment, the first data frame and second data frame may be A-MPDU.

As shown in FIG. 7, in the embodiment, after the sharing AP transmits the first data frame to the station $STA_{11}$ and the shared AP transmits the second data frame to the station $STA_{21}$, the sharing AP may transmit a multi-user BA request (MU-BAR) frame to the station $STA_{11}$ and the shared AP may also transmits a MU-BAR frame to the station $STA_{21}$. The MU-BAR frame may indicate the transmission rates and lengths of the first BA frame BA1 and the second BA frame BA2. That is, in the embodiment, the sharing AP BA type is MU-BAR, and the first BA frame BA1 and the second BA frame BA2 are trigger-based (TB) BAs triggered by MU-BAR frame.

After the transmission of the first data frame and the second data frame, the station $STA_{11}$ associated with the sharing AP may transmit the first BA frame BA1 to the sharing AP, and the station $STA_{21}$ associated with the shared AP may transmit the second BA frame BA2 to the shared AP.

Figure 8:
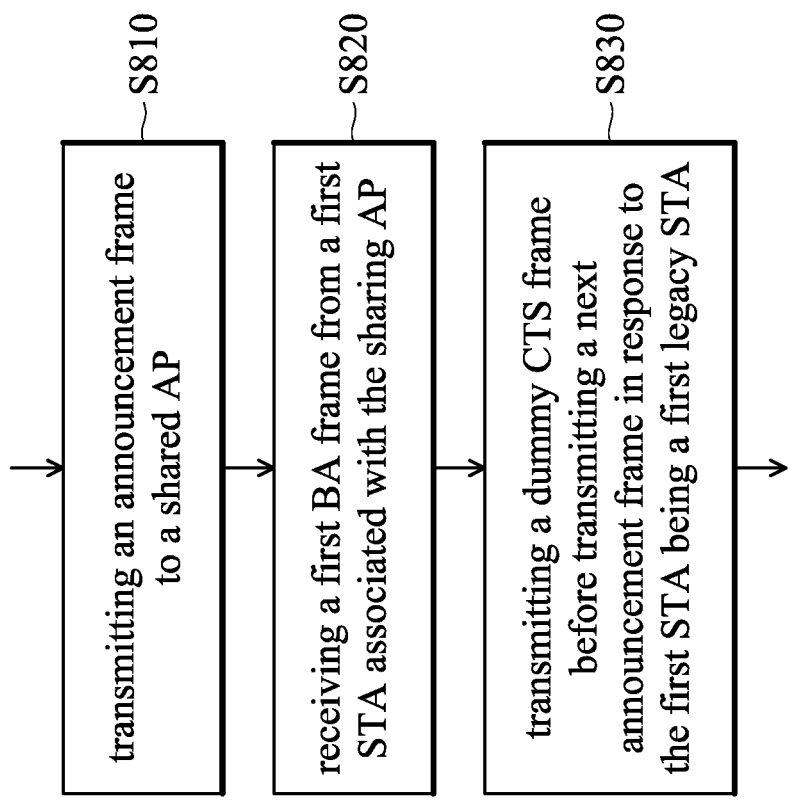
FIG. 8 is a flow chart illustrating a CO-SR transmission method according to an embodiment of the invention.

FIG. 8 is a flow chart illustrating a CO-SR transmission method according to an embodiment of the invention. The CO-SR transmission method can be applied to the wireless communication network 100 and AP 200. In addition, the CO-SR transmission method is applied to a sharing AP in the CO-SR transmission. As shown in FIG. 8, in step S810, a sharing AP may transmit an announcement frame to a shared AP.

In step S820, the sharing AP may receive a first BA frame from a first STA associated with the sharing AP.

In step S830, in response to the first STA being a first legacy STA, the sharing AP may transmit a dummy clear-to-send (CTS) frame before transmitting the next announcement frame.

In the CO-SR transmission method, the sharing AP may further transmit the dummy CTS frame after a frame space between the first BA frame and the dummy CTS frame. The total length of the first length of the first BA frame, the second length of the frame space and the third length of the dummy CTS frame is longer than the fourth length of the second BA frame. The second BA frame is transmitted to the shared AP by a second STA associated with the shared AP, and the second STA is a second legacy STA. The first legacy STA and the second legacy STA are HT STAs or VHT STAs.

In the CO-SR transmission method, the sharing AP may further transmit a data frame with a trigger frame to the first STA in response to the first STA is a HE STA or an EHT STA, and receive a trigger-based BA from the first STA.

In the CO-SR transmission method, the sharing AP may further transmit a multi-user BA request (MU-BAR) frame to the first STA in response to the first STA is a HE STA or an EHT STA, and receive a trigger-based BA from the first STA.

In the CO-SR transmission method, the announcement frame may comprise a sharing AP BA type field and a sharing AP BA length field.

Figure 9:
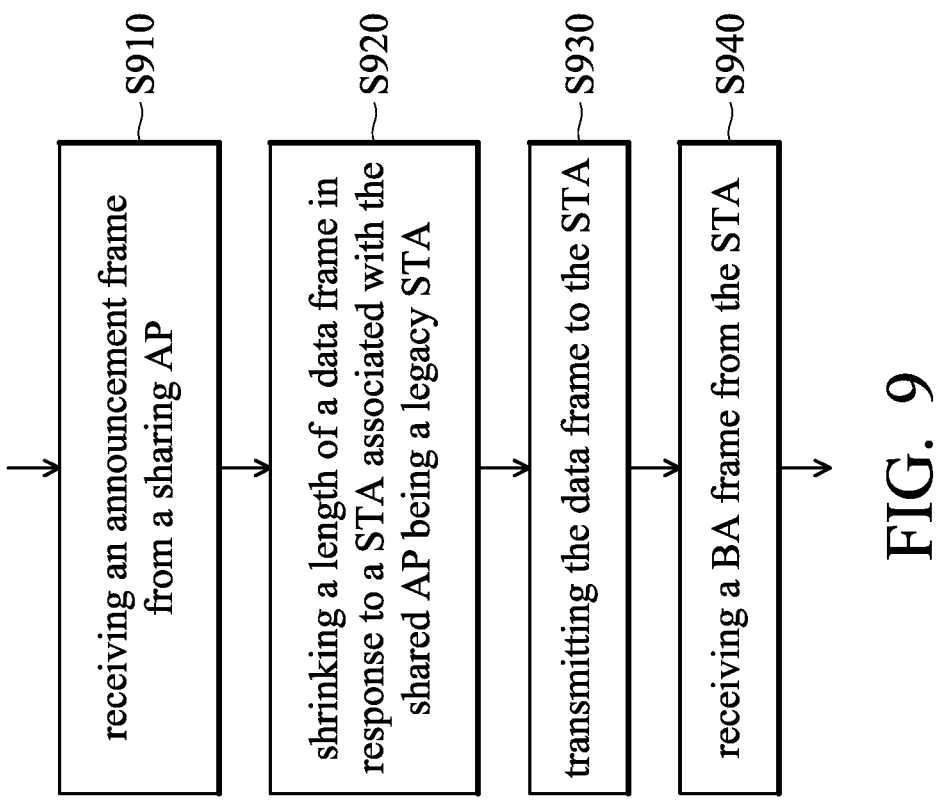
FIG. 9 is a flow chart illustrating a CO-SR transmission method according to another embodiment of the invention.

FIG. 9 is a flow chart illustrating a CO-SR transmission method according to another embodiment of the invention. The CO-SR transmission method can be applied to the wireless communication network 100 and AP 200. In addition, the —CO-SR RS transmission method is applied to a shared AP in the CO-SR transmission. As shown in FIG. 9, in step S910, a shared AP may receive an announcement frame to a sharing AP.

In step S920, the shared AP may shrink the length of the data frame in response to a STA associated with the shared AP being a legacy STA.

In step S930, the shared AP may transmit the shrunk data frame to the STA.

In step S940, the shared AP may receive a BA frame from the STA.

In the CO-SR transmission method, the shared AP may further shrink the length of the data frame by a default length (e.g., 321 μs).

In the CO-SR transmission method, the shared AP may further estimate the length of the BA frame based on a look-up table, and shrink the length of the data frame based on the length of the BA frame. In the embodiment, a tail of the BA frame is aligned with a tail of data frame transmitted by the sharing AP.

In the CO-SR transmission method, the legacy STA may a HT STA or a VHT STA.

In the CO-SR transmission method, the shared AP may further transmit a data frame with a trigger frame to the STA in response to the STA being a HE STA or an EHT STA, and receive a trigger-based BA from the STA.

In the CO-SR transmission method, the shared AP may further transmit a MU-BAR frame to the STA in response to the STA being a HE STA or an EHT STA, and receive a trigger-based BA from the STA.

In the CO-SR transmission methods provided in the invention, when the STA is legacy STA, it will be avoided that the BA frame from the STA associated with the shared AP may overlap with the next announcement frame from the sharing AP.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A coordinated-spatial reuse (CO-SR) transmission method, comprising:
    transmitting, by a transceiver of a sharing access point (AP), an announcement frame to a shared AP;
    receiving, by the transceiver, a first block acknowledgement (BA) frame from a first station (STA) associated with the sharing AP; and
    transmitting, by the transceiver, a dummy clear-to-send (CTS) frame before transmitting a next announcement frame in response to the first STA being a first legacy STA.

2. The CO-SR transmission method of claim 1, further comprising:
    transmitting, by the transceiver, the dummy CTS frame after a frame space between the first BA frame and the dummy CTS frame,
    wherein a total length of a first length of the first BA frame, a second length of the frame space and a third length of the dummy CTS frame is longer than a fourth length of a second BA frame,
    wherein the second BA frame is transmitted to the shared AP by a second STA associated with the shared AP, and the second STA is a second legacy STA.

3. The CO-SR transmission method of claim 2, wherein the first legacy STA and the second legacy STA are high-throughput (HT) STAs or very-high-throughput (VHT) STAs.

4. The CO-SR transmission method of claim 1, further comprising:
    transmitting, by the transceiver, a data frame with a trigger frame to the first STA in response to the first STA being a high-efficiency (HE) STA or an extremely-high-throughput (EHT) STA; and
    receiving, by the transceiver, a trigger-based BA from the first STA.

5. The CO-SR transmission method of claim 1, further comprising:
    transmitting, by the transceiver, a multi-user BA request (MU-BAR) frame to the first STA in response to the first STA being a HE STA or an EHT STA; and
    receiving, by the transceiver, a trigger-based BA from the first STA.

6. The CO-SR transmission method of claim 1, wherein the announcement frame comprises a sharing AP BA type field and a sharing AP BA length field.

7. A coordinated-spatial reuse (CO-SR) transmission method, comprising:
    receiving, by a transceiver of a shared access point (AP), an announcement frame from a sharing AP;
    shrinking, by a processor of the shared AP, a length of a data frame in response to a station (STA) associated with the shared AP being a legacy STA;
    transmitting, by the transceiver, the data frame to the STA; and
    receiving, by the transceiver, a block acknowledgement (BA) frame from the STA.

8. The CO-SR transmission method of claim 7, further comprising:
    shrinking, by the processor, the length of the data frame by a default length.

9. The CO-SR transmission method of claim 7, further comprising:
    estimating, by the processor, a length of the BA frame based on a look-up table; and
    shrinking, by the processor, the length of the data frame based on the length of the BA frame.

10. The CO-SR transmission method of claim 9, wherein a first tail of the BA frame is aligned with a second tail of data frame transmitted by the sharing AP.

11. The CO-SR transmission method of claim 7, wherein the legacy STA is a high-throughput (HT) STA or a very-high-throughput (VHT) STA.

12. The CO-SR transmission method of claim 7, further comprising:
    transmitting, by the transceiver, another data frame with a trigger frame to the STA in response to the STA being a high-efficiency (HE) STA or an extremely-high-throughput (EHT) STA; and
    receiving, by the transceiver, a trigger-based BA from the STA.

13. The CO-SR transmission method of claim 7, further comprising:
    transmitting, by the transceiver, a multi-user BA request (MU-BAR) frame to the STA in response to the STA being a HE STA or an EHT STA; and
    receiving, by the transceiver, a trigger-based BA from the STA.

14. An apparatus for coordinated-spatial reuse (CO-SR) transmission, comprising:
- a transceiver, wirelessly communicating with a sharing access point (AP); and
- a processor, coupled to the transceiver,
- wherein the transceiver receives an announcement frame from the sharing AP, the processor shrinks a length of a data frame in response to a station (STA) associated with the shared AP being a legacy STA, the transceiver transmits the data frame to the STA, and the transceiver receives a block acknowledgement (BA) frame from the STA.

15. The apparatus of claim 14, wherein the processor shrinks the length of the data frame by a default length.

16. The apparatus of claim 14, wherein the processor estimates a length of the BA frame based on a look-up table, and shrinks the length of the data frame based on the length of the BA frame.

17. The apparatus of claim 16, wherein a first tail of the BA frame is aligned with a second tail of data frame transmitted by the sharing AP.

18. The apparatus of claim 14, wherein the legacy STA is a high-throughput (HT) STA or a very-high-throughput (VHT) STA.

19. The apparatus of claim 14, wherein the transceiver transmits another data frame with a trigger frame to the STA in response to the STA being a high-efficiency (HE) STA or an extremely-high-throughput (EHT) STA, and receives a trigger-based BA from the STA.

20. The apparatus of claim 14, wherein the transceiver transmits a multi-user BA request (MU-BAR) frame to the STA in response to the STA being a HE STA or an EHT STA, and receives a trigger-based BA from the STA.

* * * * *